(12) United States Patent
Kawashita et al.

(10) Patent No.: US 10,763,653 B2
(45) Date of Patent: Sep. 1, 2020

(54) BRANCH CIRCUIT BODY AND ELECTRIC WIRE BRANCHING METHOD

(71) Applicant: YAZAKI CORPORATION, Tokyo (JP)

(72) Inventors: Kazuyuki Kawashita, Shizuoka (JP); Kotei O, Shizuoka (JP); Junichi Tatsumi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/373,565

(22) Filed: Apr. 2, 2019

(65) Prior Publication Data

US 2019/0312418 A1 Oct. 10, 2019

(30) Foreign Application Priority Data

Apr. 4, 2018 (JP) ................................ 2018-072366

(51) Int. Cl.
| | |
|---|---|
| *H02G 3/04* | (2006.01) |
| *H01B 7/00* | (2006.01) |
| *H01B 19/00* | (2006.01) |
| *H01R 13/6592* | (2011.01) |
| *H01R 13/66* | (2006.01) |
| *H01R 31/02* | (2006.01) |

(52) U.S. Cl.
CPC ......... *H02G 3/0481* (2013.01); *H01B 7/0045* (2013.01); *H01B 19/00* (2013.01); *H01R 13/6592* (2013.01); *H01R 13/66* (2013.01); *H01R 31/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,755,898 | A | * | 4/1930 | Root .................. F16L 41/12 285/133.4 |
| 1,983,928 | A | * | 12/1934 | Brown ................ H04R 25/04 174/70 R |
| 2,166,420 | A | * | 7/1939 | Robertson ........... H01B 7/0063 174/72 A |
| 2,209,560 | A | * | 7/1940 | Carlson .................. H02G 5/06 439/114 |
| 2,299,140 | A | * | 10/1942 | Hanson ............... H01B 7/0045 174/72 A |
| 2,595,452 | A | * | 5/1952 | Geist .................. H02G 3/0487 174/68.3 |

(Continued)

FOREIGN PATENT DOCUMENTS

| | | |
|---|---|---|
| CN | 107393634 A | 11/2017 |
| JP | 2009-38032 A | 2/2009 |
| WO | 2017/073281 A1 | 5/2017 |

*Primary Examiner* — Binh B Tran
*Assistant Examiner* — Krystal Robinson
(74) *Attorney, Agent, or Firm* — Kenealy Vaidya LLP

(57) ABSTRACT

A branch circuit body includes a first electric wire, a first shield tube that covers the first electric wire and has an opening, a second electric wire that is electrically connected to the first electric wire and is drawn out from the opening, a second shield tube that covers the second electric wire and has an end portion inserted into the opening, and an engaging member that is provided on the first electric wire and configured to engage with the end portion of the second shield tube inserted from the opening.

11 Claims, 14 Drawing Sheets

(56) References Cited

U.S. PATENT DOCUMENTS

| | | | | |
|---|---|---|---|---|
| 2,925,459 A * | 2/1960 | Priaroggia | ............ | H02G 15/10 174/73.1 |
| 3,013,108 A * | 12/1961 | Sweeney | ................. | H01B 9/06 174/99 R |
| 3,023,692 A * | 3/1962 | Crown | ................ | H02G 3/0456 100/1 |
| 3,163,712 A * | 12/1964 | Cochran | ................... | F16L 3/12 174/164 |
| 3,175,032 A * | 3/1965 | Strauss | ................. | H02G 15/24 174/93 |
| 3,180,923 A * | 4/1965 | Gow | .................... | H02G 3/0487 174/72 A |
| 3,192,377 A * | 6/1965 | Abolins | ................... | B60Q 1/32 362/485 |
| 3,207,839 A * | 9/1965 | Joly | ..................... | H01R 25/162 174/72 C |
| 3,497,245 A * | 2/1970 | Metzger | ................ | F16L 41/021 285/130.1 |
| 3,627,903 A * | 12/1971 | Plummer | ............. | H01B 7/0045 174/72 A |
| 3,707,865 A * | 1/1973 | Oriani | .................... | C21D 9/50 72/340 |
| 3,711,633 A * | 1/1973 | Ghirardi | ................. | H02G 3/06 174/135 |
| 3,819,848 A * | 6/1974 | Fry | ...................... | H01B 7/0838 174/72 A |
| 3,949,457 A * | 4/1976 | Fortsch | .................. | H01R 43/00 29/755 |
| 3,984,622 A * | 10/1976 | Ross | ..................... | H01B 7/0045 174/72 A |
| 4,103,940 A * | 8/1978 | Bills | ..................... | F16L 41/084 285/189 |
| 4,114,014 A * | 9/1978 | Shogo | ............. | H01B 13/01245 219/56 |
| 4,229,613 A * | 10/1980 | Braun | ................... | B29D 23/001 138/103 |
| 4,384,167 A * | 5/1983 | Nestor | ................. | H02G 3/0468 174/135 |
| 4,467,002 A * | 8/1984 | Crofts | ................. | B29C 61/0616 428/34.9 |
| 4,470,622 A * | 9/1984 | Pate | ..................... | F16L 3/1236 285/419 |
| 4,478,252 A * | 10/1984 | McLoughlin | ........... | B29C 61/10 138/140 |
| 4,532,168 A * | 7/1985 | Steele | ................. | B29C 61/0633 428/99 |
| 4,564,163 A * | 1/1986 | Barnett | ..................... | F16L 3/12 24/16 PB |
| 4,576,666 A * | 3/1986 | Harris | ............... | B29C 66/52231 156/85 |
| 4,626,067 A * | 12/1986 | Watson | ............... | G02B 6/4472 385/86 |
| 4,739,801 A * | 4/1988 | Kimura | ................... | F16G 13/10 138/120 |
| 4,756,643 A * | 7/1988 | Hurley | .................... | E02B 11/00 405/36 |
| 4,859,020 A * | 8/1989 | Deusser | ............... | G02B 6/4415 385/53 |
| 4,874,908 A * | 10/1989 | Johansson | ............... | H02B 1/202 174/72 A |
| 4,920,235 A * | 4/1990 | Yamaguchi | ........ | H01B 11/1033 138/167 |
| 4,986,575 A * | 1/1991 | Braun | .................... | H02G 3/0468 285/133.11 |
| 5,012,391 A * | 4/1991 | Schultz, Jr. | ............ | H05K 3/103 174/251 |
| 5,105,054 A * | 4/1992 | Kirma | ................ | H01R 13/6592 174/2 |
| 5,125,060 A * | 6/1992 | Edmundson | ............... | G02B 6/2804 385/100 |
| 5,126,507 A * | 6/1992 | Kirma | .................... | H05K 9/00 138/108 |
| 5,203,721 A * | 4/1993 | Buck | .................... | H01R 9/0509 439/581 |
| 5,210,812 A * | 5/1993 | Nilsson | ................ | G02B 6/2804 385/100 |
| 5,234,360 A * | 8/1993 | Kramer, Jr. | .......... | H01R 25/003 439/367 |
| 5,257,974 A * | 11/1993 | Cox | .................... | A61M 25/104 600/585 |
| 5,267,338 A * | 11/1993 | Bullock | ................. | G02B 6/447 385/100 |
| 5,271,585 A * | 12/1993 | Zetena, Jr. | ........... | G02B 6/4459 174/95 |
| 5,306,870 A * | 4/1994 | Abat | .................... | H01R 9/0506 174/659 |
| 5,352,855 A * | 10/1994 | Potter | .................... | H02G 3/0481 174/135 |
| 5,367,126 A * | 11/1994 | Kikuchi | ................ | H01B 7/0045 174/135 |
| 5,378,853 A * | 1/1995 | Clouet | .................. | H01B 7/0045 174/36 |
| 5,381,501 A * | 1/1995 | Cardinal | ................. | G02B 6/0006 385/134 |
| 5,394,502 A * | 2/1995 | Caron | .................... | G02B 6/4473 174/72 A |
| 5,414,212 A * | 5/1995 | Clouet | ................... | H01B 7/0045 174/36 |
| 5,501,605 A * | 3/1996 | Ozaki | .................. | B60R 16/0207 174/72 A |
| 5,535,787 A * | 7/1996 | Howell | ................ | H02G 3/0487 138/110 |
| 5,615,293 A * | 3/1997 | Sayegh | ................. | G02B 6/4403 385/100 |
| 5,676,563 A * | 10/1997 | Kondo | .................. | E04D 13/103 439/435 |
| 5,734,777 A * | 3/1998 | Merriken | ................ | G02B 6/445 385/135 |
| 5,828,009 A * | 10/1998 | James | ............. | H01B 13/01209 174/135 |
| 5,892,177 A * | 4/1999 | Mazaris | .................... | H02G 3/26 174/135 |
| 5,901,756 A * | 5/1999 | Goodrich | ................ | F16L 3/233 138/110 |
| 5,911,450 A * | 6/1999 | Shibata | ............... | B60R 16/0207 174/112 |
| 5,957,505 A * | 9/1999 | Jarvenkyla | ............. | F16L 41/14 285/125.1 |
| 5,973,265 A * | 10/1999 | O'Brien | .................... | H01R 4/72 174/117 F |
| 6,011,399 A * | 1/2000 | Matsumaru | ............ | G01R 31/11 324/538 |
| 6,042,418 A * | 3/2000 | Cummings | ............ | A47G 33/08 439/505 |
| 6,089,615 A * | 7/2000 | Jappinen | ................ | F16L 41/14 285/125.1 |
| 6,222,976 B1 * | 4/2001 | Shahid | ................. | G02B 6/3608 385/114 |
| 6,330,746 B1 * | 12/2001 | Uchiyama | ............... | G06F 30/15 29/872 |
| 6,394,849 B2 * | 5/2002 | Kasai | .................... | H01R 9/2458 439/655 |
| 6,422,891 B1 * | 7/2002 | Huang | .................... | F21V 23/06 362/249.01 |
| 6,439,923 B1 * | 8/2002 | Kirkendall | ............. | H01R 27/02 439/502 |
| 6,466,725 B2 * | 10/2002 | Battey | .................. | G02B 6/4473 385/100 |
| 6,503,098 B2 * | 1/2003 | Aoki | .................... | B60R 16/0207 439/502 |
| 6,610,929 B1 * | 8/2003 | Motokawa | .......... | B60R 16/0207 174/135 |
| 6,619,697 B2 * | 9/2003 | Griffioen | ................. | F16L 41/023 285/126.1 |
| 6,674,004 B2 * | 1/2004 | Ito | .................... | B60R 16/0215 174/135 |

(56) References Cited

U.S. PATENT DOCUMENTS

| | | | |
|---|---|---|---|
| 6,688,803 B2 * | 2/2004 | Maria Van Giezen | F16B 7/044 403/245 |
| 6,763,166 B2 * | 7/2004 | Yow, Jr. | G02B 6/4472 385/114 |
| 6,767,255 B1 * | 7/2004 | Croswell | H01R 25/003 439/106 |
| 6,771,861 B2 * | 8/2004 | Wagner | G02B 6/4472 385/100 |
| 6,960,722 B2 * | 11/2005 | Frederick | B60R 16/0215 138/121 |
| 7,155,093 B2 * | 12/2006 | Elkins, II | G02B 6/4475 385/100 |
| 7,179,997 B2 * | 2/2007 | Yamamoto | B60R 16/0215 174/71 R |
| 7,266,274 B2 * | 9/2007 | Elkins, II | G02B 6/4473 385/100 |
| 7,277,614 B2 * | 10/2007 | Cody | G02B 6/3807 385/100 |
| 7,294,789 B1 * | 11/2007 | Watthanasintham | B60R 16/0215 174/135 |
| 7,624,503 B2 * | 12/2009 | Fukuda | H01B 7/0045 174/72 A |
| 7,769,261 B2 * | 8/2010 | Lu | G02B 6/4475 385/100 |
| 8,267,872 B2 * | 9/2012 | Ressemann | A61M 25/09 600/585 |
| 8,367,182 B2 * | 2/2013 | Rodrigues | H02G 3/0481 174/135 |
| 8,481,868 B2 * | 7/2013 | Dennes | H01R 4/2433 174/549 |
| 9,337,634 B2 * | 5/2016 | Sato | H02G 3/0481 |
| 9,373,943 B1 * | 6/2016 | Tannenbaum | H02G 3/0437 |
| 9,531,145 B2 * | 12/2016 | Byrne | H01R 25/006 |
| 9,595,369 B2 * | 3/2017 | Hamabayashi | H01B 7/0045 |
| 9,752,763 B2 * | 9/2017 | Lin | F21V 23/002 |
| 10,232,808 B2 * | 3/2019 | Ogue | B60R 16/0215 |
| 10,256,619 B2 * | 4/2019 | Takahashi | H01B 7/285 |
| 10,315,592 B2 * | 6/2019 | Osada | B60R 16/0215 |
| 10,490,986 B2 * | 11/2019 | Osada | B60R 16/0215 |
| D871,349 S * | 12/2019 | Kalkstein | D13/156 |
| 10,500,079 B2 * | 12/2019 | Shrum | A61F 2/954 |
| 10,605,936 B2 * | 3/2020 | Drange | G01V 1/3808 |
| 2002/0081083 A1 * | 6/2002 | Griffioen | G02B 6/502 385/109 |
| 2002/0173840 A1 * | 11/2002 | Brucker | A61F 2/958 623/1.16 |
| 2003/0006057 A1 * | 1/2003 | Ito | B60R 16/0215 174/68.3 |
| 2004/0077191 A1 * | 4/2004 | Murakoshi | H05K 7/026 439/76.2 |
| 2004/0154817 A1 * | 8/2004 | Sudo | H02G 3/0468 174/481 |
| 2006/0064036 A1 * | 3/2006 | Osborne | A61M 25/01 600/585 |
| 2007/0031232 A1 * | 2/2007 | Kurebayashi | B25J 19/0029 414/682 |
| 2008/0296037 A1 * | 12/2008 | Burland | H02G 3/0487 174/36 |
| 2009/0034165 A1 | 2/2009 | Tyler et al. | |
| 2009/0052122 A1 * | 2/2009 | Johnson | H02G 3/00 361/643 |
| 2010/0090851 A1 * | 4/2010 | Hauser | H01R 25/003 340/657 |
| 2010/0096184 A1 * | 4/2010 | Ambo | B60R 16/0215 174/72 A |
| 2011/0066220 A1 * | 3/2011 | Laguna | A61F 2/90 623/1.2 |
| 2011/0081121 A1 * | 4/2011 | Le Dissez | G02B 6/4475 385/102 |
| 2011/0155458 A1 * | 6/2011 | Kato | B60R 16/0215 174/74 R |
| 2012/0051701 A1 * | 3/2012 | Sicari | G02B 6/4463 385/100 |
| 2012/0076342 A1 * | 3/2012 | Weber | D07B 1/16 381/384 |
| 2012/0261184 A1 * | 10/2012 | Kitamura | H02G 3/0468 174/72 A |
| 2013/0068522 A1 * | 3/2013 | Ogawa | B60R 16/0215 174/72 A |
| 2013/0277107 A1 * | 10/2013 | Hara | H02G 3/32 174/72 A |
| 2013/0292159 A1 * | 11/2013 | Gotou | H02G 3/305 174/250 |
| 2014/0033524 A1 * | 2/2014 | Sato | H01B 13/012 29/825 |
| 2014/0076628 A1 * | 3/2014 | McGrath | H01B 7/0045 174/84 R |
| 2015/0114711 A1 * | 4/2015 | Dew | H01B 7/0045 174/72 A |
| 2015/0229115 A1 * | 8/2015 | George | H01B 13/06 307/31 |
| 2015/0279514 A1 * | 10/2015 | Sato | B60R 16/0207 174/72 A |
| 2015/0280411 A1 * | 10/2015 | Plathe | H02G 3/18 174/660 |
| 2015/0329069 A1 * | 11/2015 | Daugherty | B60R 16/0207 174/72 A |
| 2016/0036151 A1 * | 2/2016 | Tominaga | B60R 16/0207 439/884 |
| 2016/0055938 A1 * | 2/2016 | Hamabayashi | H01B 13/01263 174/72 A |
| 2016/0134089 A1 * | 5/2016 | Peterson | F16L 3/23 174/72 A |
| 2016/0260523 A1 * | 9/2016 | Aragiri | B60R 16/0215 |
| 2017/0243673 A1 * | 8/2017 | Nakashima | C09D 151/08 |
| 2017/0274843 A1 | 9/2017 | Adachi et al. | |
| 2017/0313265 A1 * | 11/2017 | Shimizu | B60R 16/023 |
| 2017/0327060 A1 * | 11/2017 | Nakajima | H01B 13/01254 |
| 2018/0029543 A1 * | 2/2018 | Cho | B60T 7/12 |
| 2018/0138676 A1 * | 5/2018 | Yabashi | H02G 3/0406 |
| 2018/0174704 A1 * | 6/2018 | Sugino | H01B 7/0045 |
| 2018/0301242 A1 | 10/2018 | Sugino | |
| 2019/0329724 A1 * | 10/2019 | Izawa | B60R 16/0215 |
| 2020/0114568 A1 * | 4/2020 | Dong | H05B 3/04 |

\* cited by examiner

BRANCH CIRCUIT BODY AND ELECTRIC WIRE BRANCHING METHOD

CROSS REFERENCE TO RELATED APPLICATION

This application is based on and claims priority under 35 USC 119 from Japanese application No. 2018-072366 filed on Apr. 4, 2018, the contents of which are incorporated herein by reference.

TECHNICAL FIELD

The present disclosure relates to a branch circuit body and an electric wire branching method.

BACKGROUND

JP-A-2009-038032 discloses a power distribution module including a housing defining a shield interface in which a connector at an end portion of a shielded electric wire is connected to the power distribution module and the shielded electric wire is branched from the power distribution module.

The structure of JP-A-2009-038032 requires the power distribution module including the housing defining the shield interface and the connector for connecting the power distribution module to the power distribution module.

Therefore, in the structure, the number of components is large, the cost increases, and the structure becomes complicated and the size thereof increases. Moreover, in the structure using the power distribution module, the number of the branch circuits and the branch positions are restricted, and therefore it is difficult to flexibly change the number of electric wires and the branch positions so that a versatility is poor.

SUMMARY

The present disclosure relates to a branch circuit body and an electric wire branching method that would easily branch an electric wire at low cost while ensuring a good shield property, and further would simplify a structure, reduce a size and improve versatility.

In accordance with embodiments, a branch circuit body includes a first electric wire, a first shield tube that covers the first electric wire and has an opening, a second electric wire that is electrically connected to the first electric wire and is drawn out from the opening, a second shield tube that covers the second electric wire and has an end portion inserted into the opening, and an engaging member that is provided on the first electric wire and configured to engage with the end portion of the second shield tube inserted from the opening.

The engaging member may include an engaging claw which engages the end portion of the second shield tube.

The branch circuit may include a mold portion that covers a connecting portion of the first electric wire and the second electric wire.

In accordance with embodiments, in an electric wire branching method, a first electric wire and a second electric wire are electrically connected to each other, the first electric wire and the second electric wire are inserted through a first shield tube, the second electric wire is drawn from an opening of the first shield tube in a vicinity of a connecting portion of the first electric wire and the second electric wire, the second electric wire is inserted through a second shield tube, an end portion of the second shield tube is inserted into the opening, and the end portion of the second shield tube is engaged to an engaging member provided on the first electric wire.

In accordance with embodiments, in a manufacturing method of branch circuit body, a first electric wire and a second electric wire are electrically connected to each other, the first electric wire and the second electric wire are inserted through a first shield tube, the second electric wire is drawn from an opening of the first shield tube in a vicinity of a connecting portion of the first electric wire and the second electric wire, the second electric wire is inserted through a second shield tube, an end portion of the second shield tube is inserted into the opening, and the end portion of the second shield tube is engaged to an engaging member provided on the first electric wire.

Exemplary embodiments will be described in detail based on drawings.

BRIEF DESCRIPTION OF DRAWINGS

FIG. 6A is a plan view of the first electric wire and the second electric wire with conductors exposed, FIG. 6B is a plan view of the first electric wire and the second electric wire with the conductors being joined to each other, and FIG. 6C is a perspective view of the connecting portion of the first electric wire and the second electric wire covered with a mold portion.

FIG. 7A is a perspective view of a branch portion of the first electric wire and the second electric wire with mold portions being overlapped, FIG. 7B is a perspective view of the branch portion of the first electric wire and the second electric wire covered with a first shield tube, and FIG. 7C is a perspective view of the branch portion of the first electric wire and the second electric wire in a state where openings are formed on the first shield tube.

FIG. 8A is a perspective view of the branch portion of the first electric wire and the second electric wire in a state where the second electric wires are drawn out from the openings, and FIG. 8B is a perspective view of the branch portion of the first electric wire and the second electric wire in a state where second shield tubes are attached to the second electric wires.

DETAILED DESCRIPTION OF THE EMBODIMENTS

Hereinafter, exemplary embodiments will be described with reference to the drawings.

Figure 1:
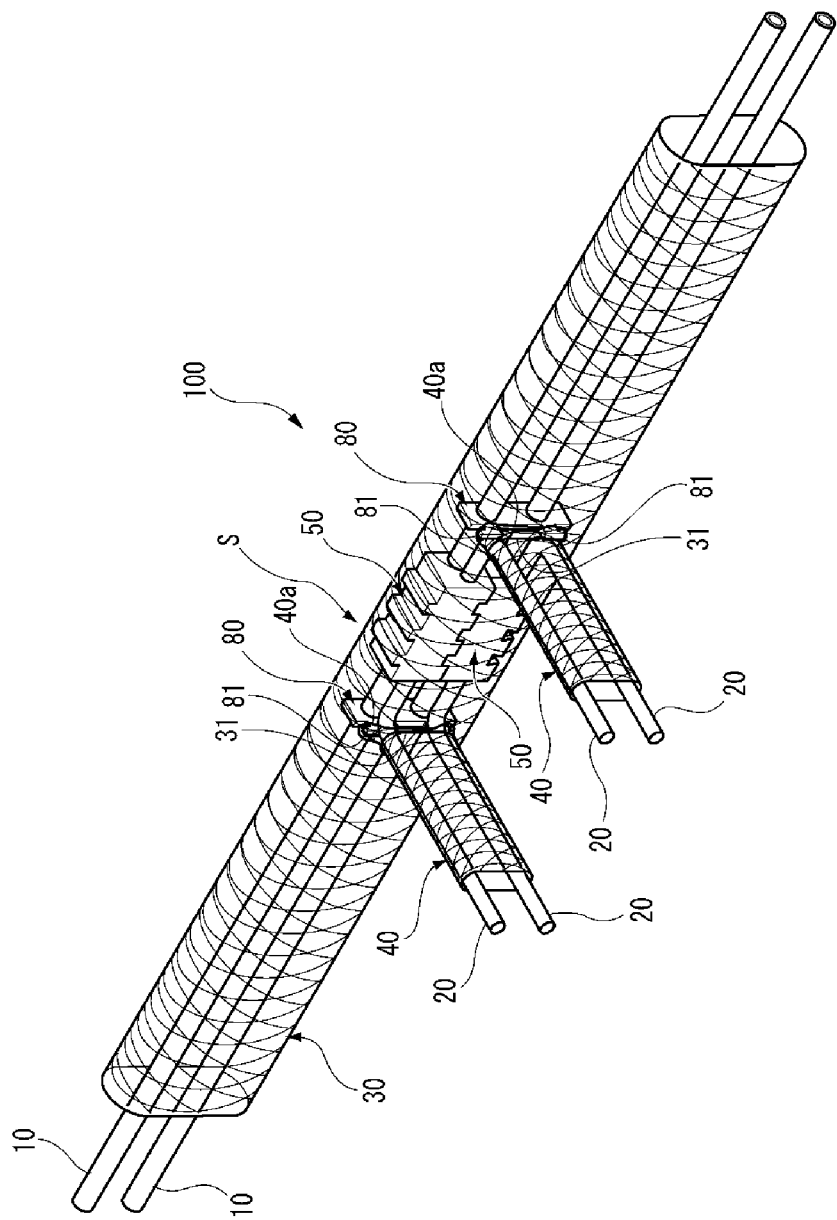
FIG. 1 is a perspective view of a branch circuit body according to an embodiment.
Figure 2:
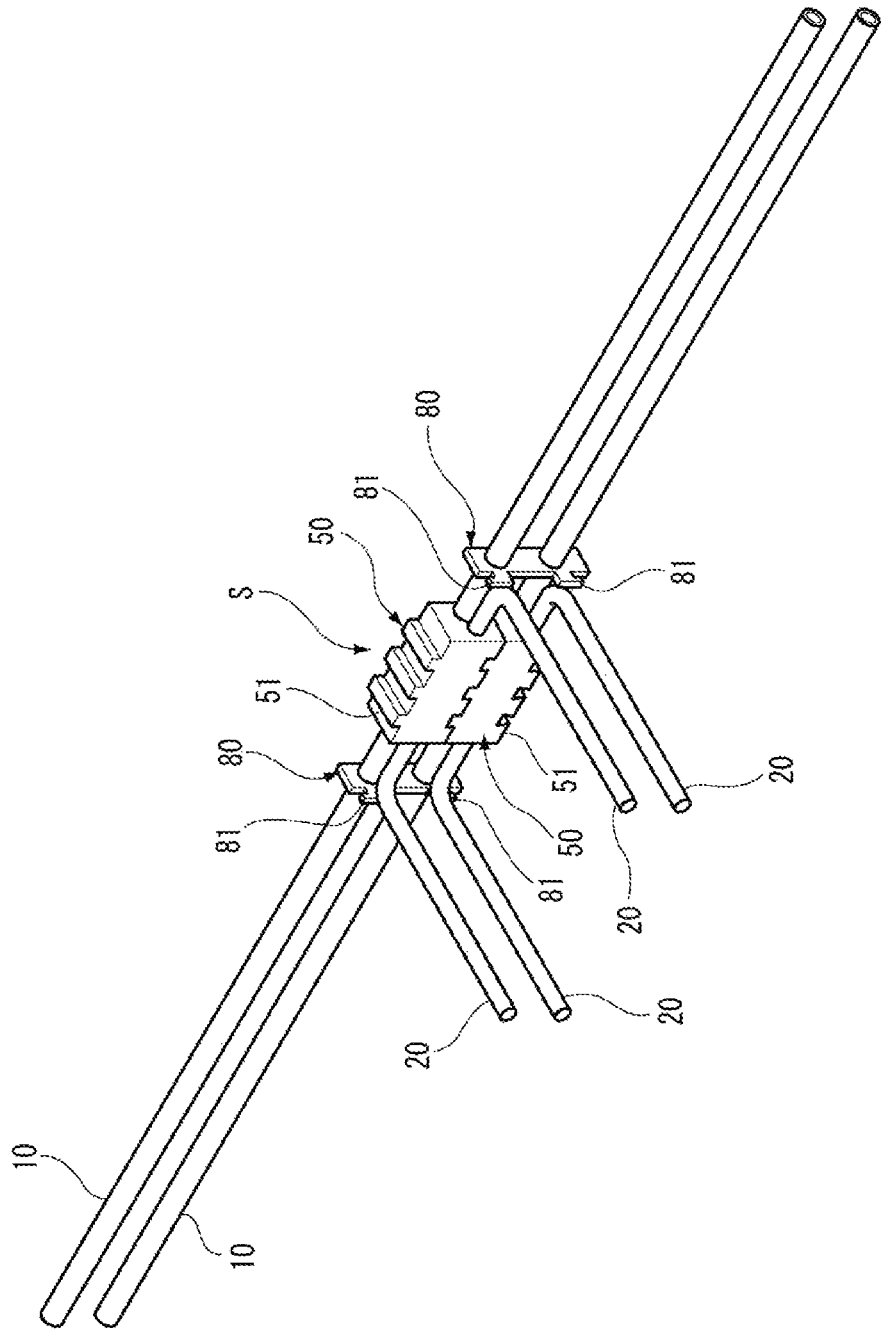
FIG. 2 is a perspective view of the branch circuit body shown in FIG. 1 with a shield tube removed.
Figure 3:
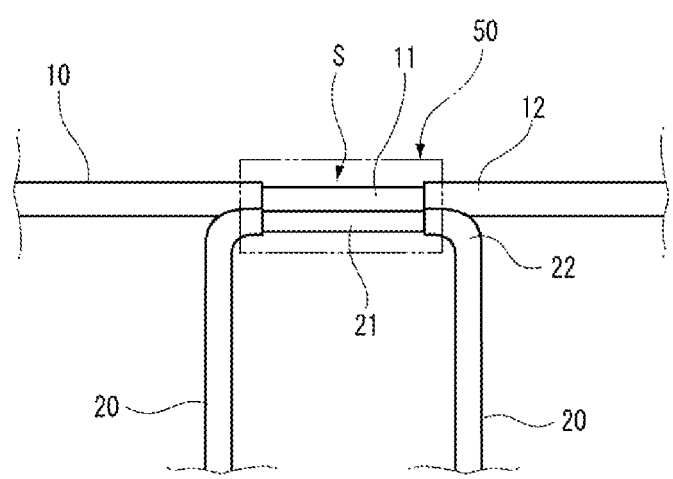
FIG. 3 is a plan view of a connecting portion between a first electric wire and a second electric wire.
Figure 4:
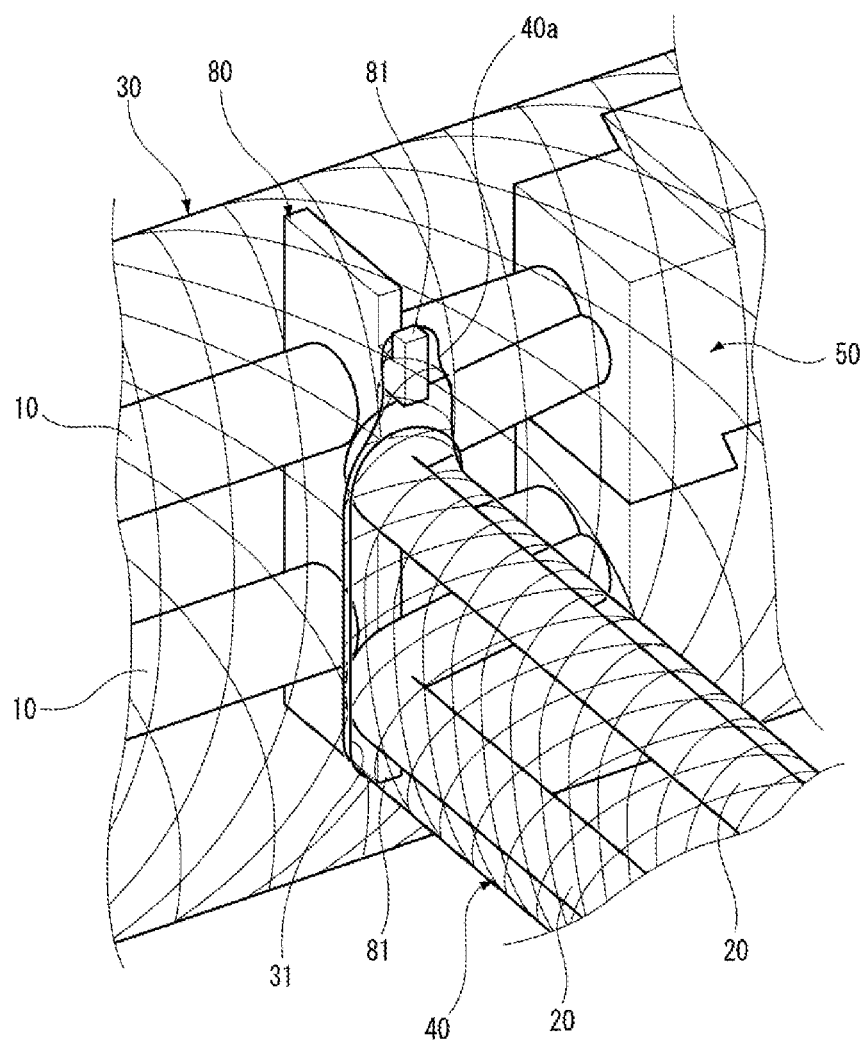
FIG. 4 is a perspective view of an engaging member to which an end portion of a second shield tube is engaged.
Figure 5:
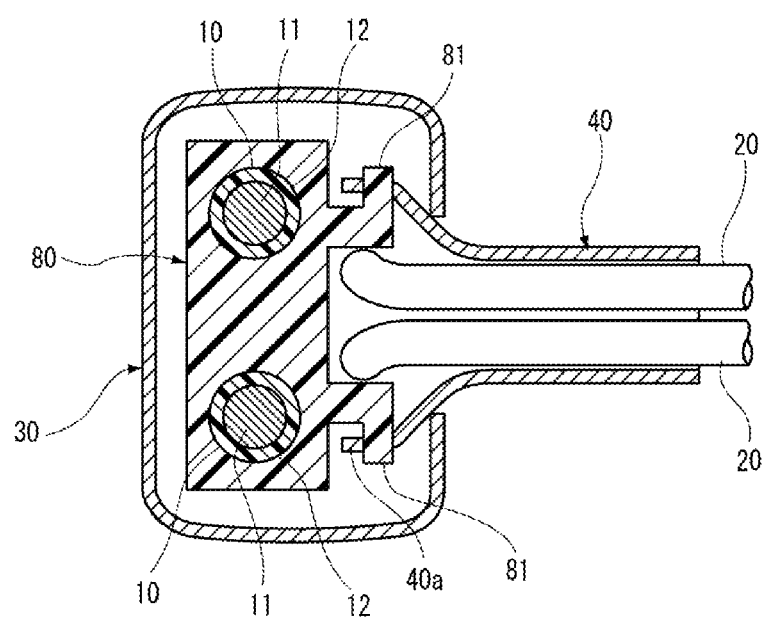
FIG. 5 is a cross-sectional view of a portion of the second shield tube engaged by the engaging member.

FIG. 1 is a perspective view of a branch circuit body according to an embodiment. FIG. 2 is a perspective view of the branch circuit body with a shield tube removed. FIG. 3 is a plan view of a connecting portion between a first electric wire and a second electric wire. FIG. 4 is a perspective view of an engaging member to which an end portion of a second shield tube is engaged. FIG. 5 is a cross-sectional view of a portion of the second shield tube engaged by the engaging member.

As shown in FIG. 1, a branch circuit body 100 according to an embodiment includes a first electric wire 10, a second electric wire 20, a first shield tube 30 and a second shield tube 40. The branch circuit body 100 is a circuit body having a shield function. The first electric wire 10 is a trunk wire, and the first shield tube 30 is a shield tube for a trunk wire that covers and shields the periphery of the first electric wire 10. The second electric wire 20 is a branch line branched from the first electric wire 10 which is the trunk line, and the second shield tube 40 is a shield tube for a branch line that covers and shields the periphery of the second electric wire 20. The branch circuit body 100 is used to supply electric power from a power source such as a battery to various electrical components, for example, in which the first electric wire 10 is connected to the power supply or the like, and the second electric wire 20 is connected to various electrical components or the like.

As shown in FIG. 2, a plurality of (two in the present embodiment) the first electric wires 10 are provided and routed in parallel to each other. A plurality of (two in the present embodiment) the second electric wires 20 are provided and separately drawn from the first electric wires 10. Each of the second electric wires 20 extends in the same direction orthogonal to the first electric wires 10.

A branch portion S of the second electric wire 20 in each first electric wire 10 is covered by a mold portion 50 formed of insulating resin for waterproof. The mold portion 50 has a connecting surface 51 whose upper and lower surfaces are uneven. The upper and lower mold portions 50 are connected in a state of being positioned in a longitudinal direction by engaging the unevenness of the connecting surface 51 with each other.

Plate-shaped engaging members 80 are fixed to the first electric wires 10 on both sides of the branch portions S having the mold portion 50. The engaging members 80 are formed by resin and molded integrally with the first electric wires 10. The engaging member 80 includes two engaging claws 81 formed on one side edge. The engaging claws 81 are extended in a direction separating from each other.

As shown in FIG. 3, the first electric wire 10 is an insulated electric wire in which an outer sheath 12 formed of insulating resin covers an outer periphery of a conductor 11 including a stranded wire or a single wire formed by stranding element wires made of copper or a copper alloy, or aluminum or an aluminum alloy, for example. The second electric wire 20 is an insulated electric wire in which an outer sheath 22 formed of insulating resin covers an outer periphery of a conductor 21 including a stranded wire or a single wire formed by stranding element wires made of copper or a copper alloy, or aluminum or an aluminum alloy, for example. In the branch portion S, a part of the outer sheaths 12, 22 are removed from the first electric wire 10 and the second electric wire 20 to expose the conductors 11, 21, and the exposed conductors 11, 21 are joined to each other and are electrically connected to each other. The conductors 11, 21 are joined to each other by ultrasonic welding or a bonder, for example.

As shown in FIG. 1, the first shield tube 30 is formed in a cylindrical shape. The first electric wires 10 are inserted into the first shield tube 30. Accordingly, the outer peripheries of the first electric wires 10 are collectively covered by the first shield tube 30. The second shield tube 40 is formed in a cylindrical shape. The second electric wires 20 are inserted into the second shield tube 40. Accordingly, the outer peripheries of the second electric wires 20 are collectively covered by the second shield tube 40.

The first shield tube 30 and the second shield tube 40 are separately formed by knitting the element wires made of a conductive metal material such as copper or a copper alloy into a tube shape and having flexibility.

The first shield tube 30 has two openings 31 in the vicinity of the branch portions S which are the connecting portions of the first electric wires 10 and the second electric wires 20, and the second electric wires 20 are drawn out from the openings 31. The engaging members 80 provided on the first electric wires 10 are disposed at positions facing the openings 31.

As shown in FIGS. 4 and 5, an end portion 40a of the second shield tube 40 is inserted into the opening 31. The end portion 40a of the second shield tube 40 inserted into the opening 31 is engaged by two engaging claws 81 of the engaging member 80. Accordingly, the second shield tube 40 inserted into the opening 31 is joined to the first shield tube 30 without gaps.

Next, an electric wire branching method that branches the electric wires to obtain the branch circuit body 100 will be described.

Figure 6A:
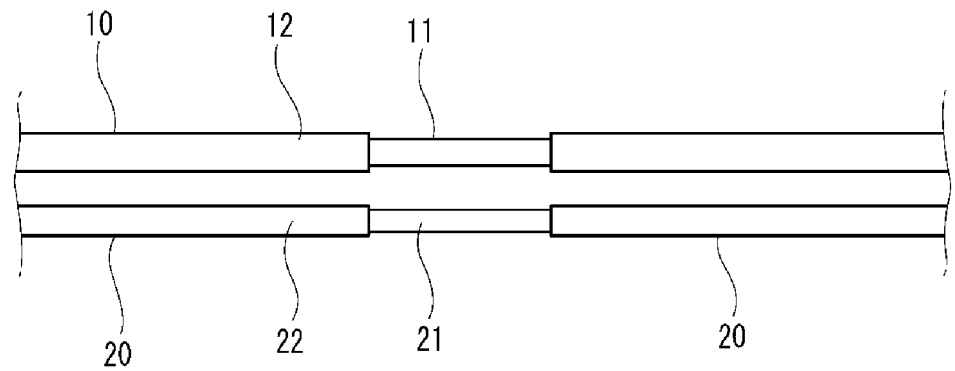
FIGS. 6A to 6C are views for describing an electric wire branching method according to an embodiment.
Figure 6B:
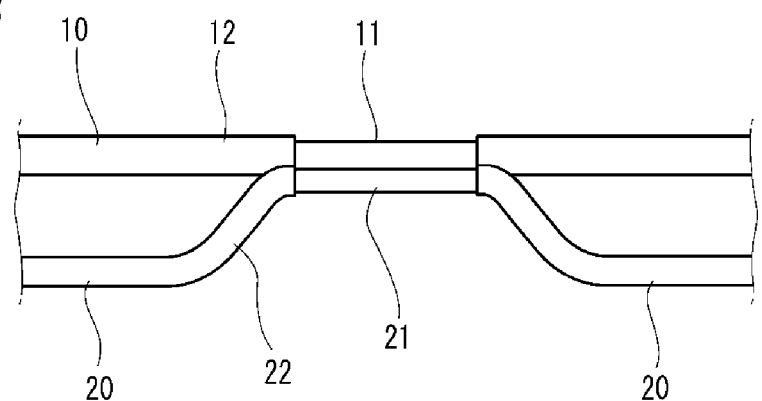
Figure 6C:
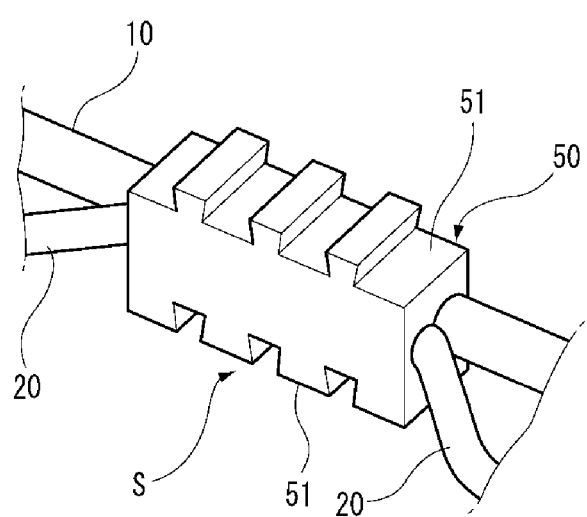
Figure 7A:
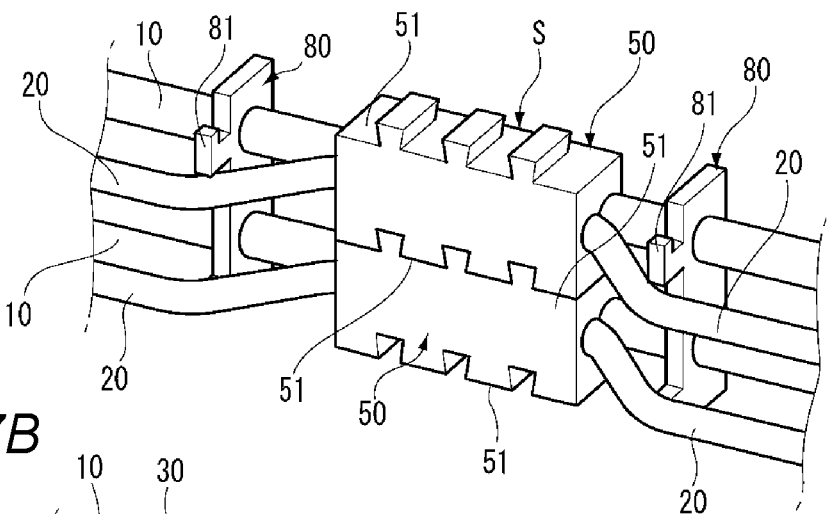
FIGS. 7A to 7C are views for describing the electric wire branching method according to an embodiment.
Figure 7B:
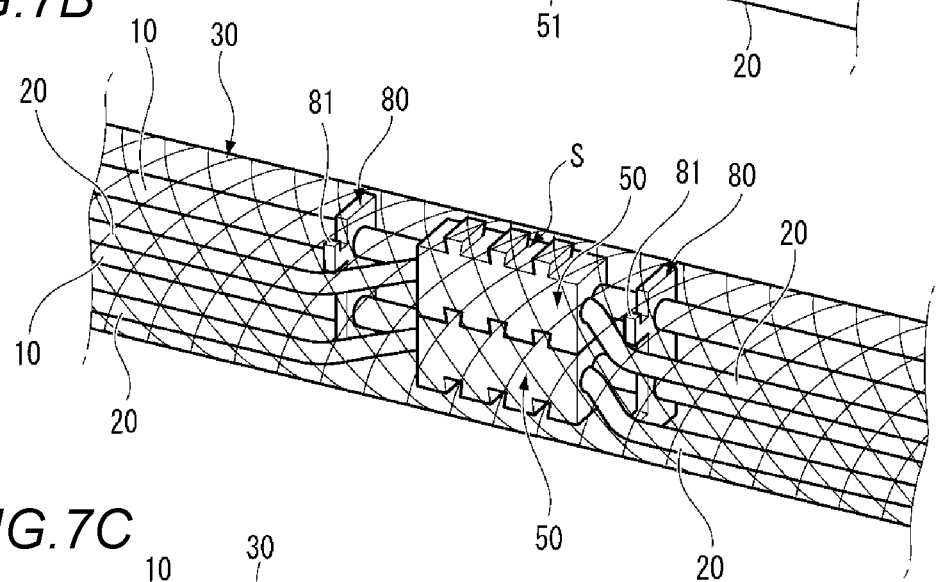
Figure 7C:
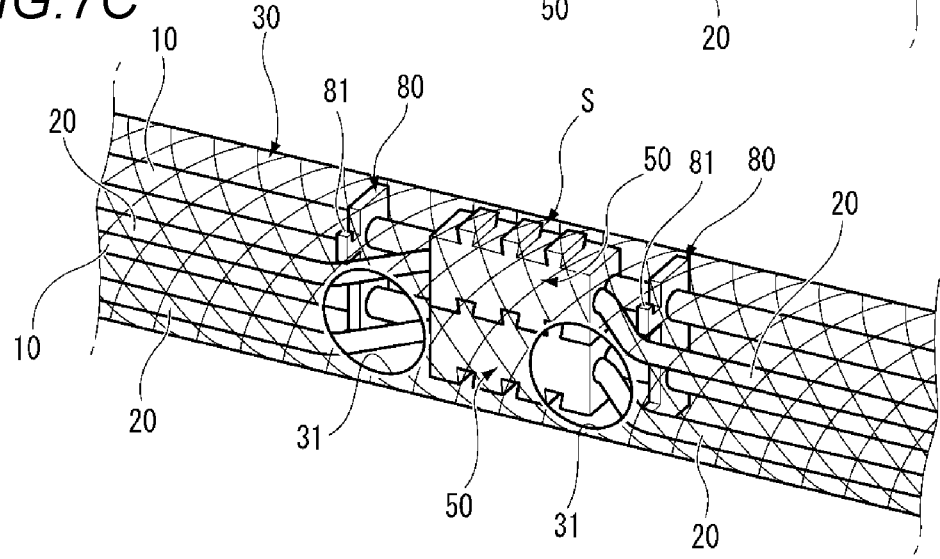
Figure 8A:
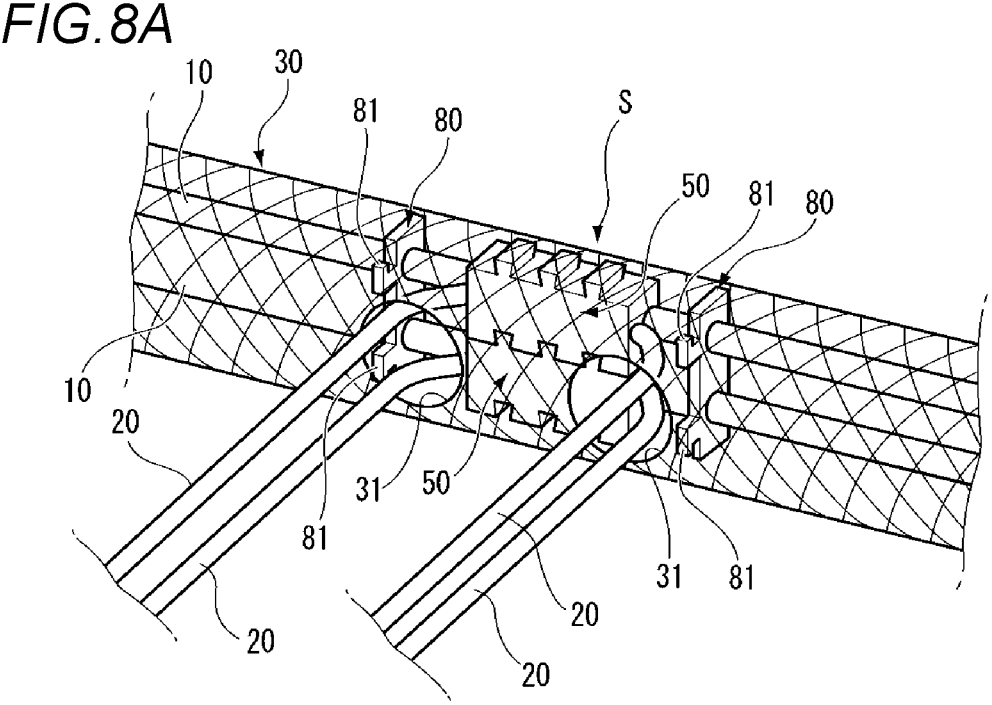
FIGS. 8A and 8B are views for describing the electric wire branching method according to an embodiment.
Figure 8B:
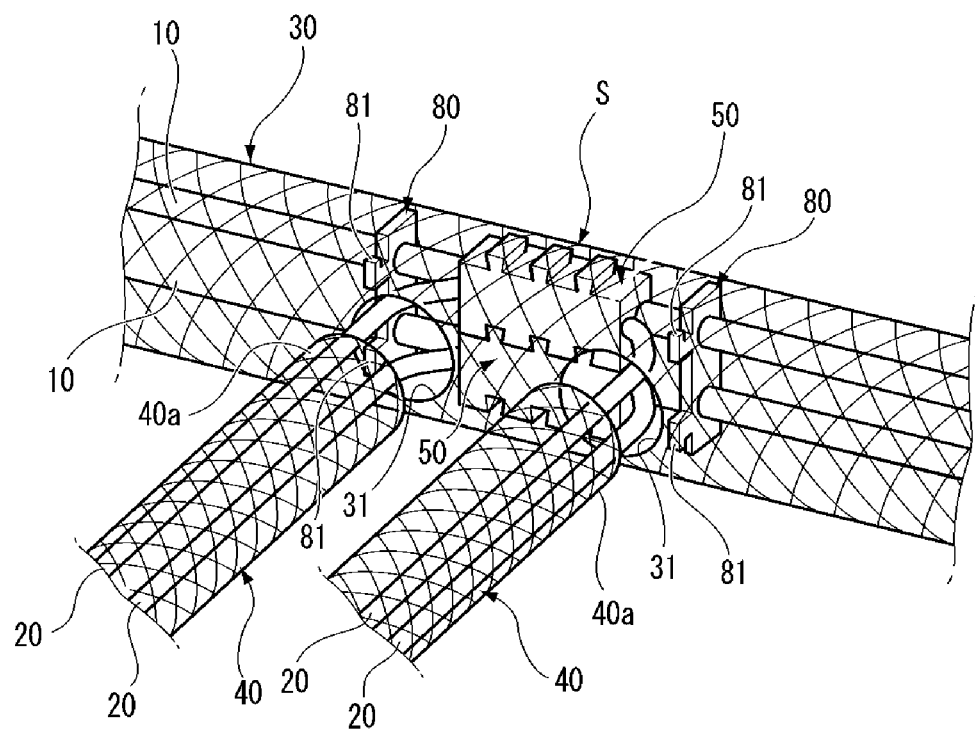
Figure 9:
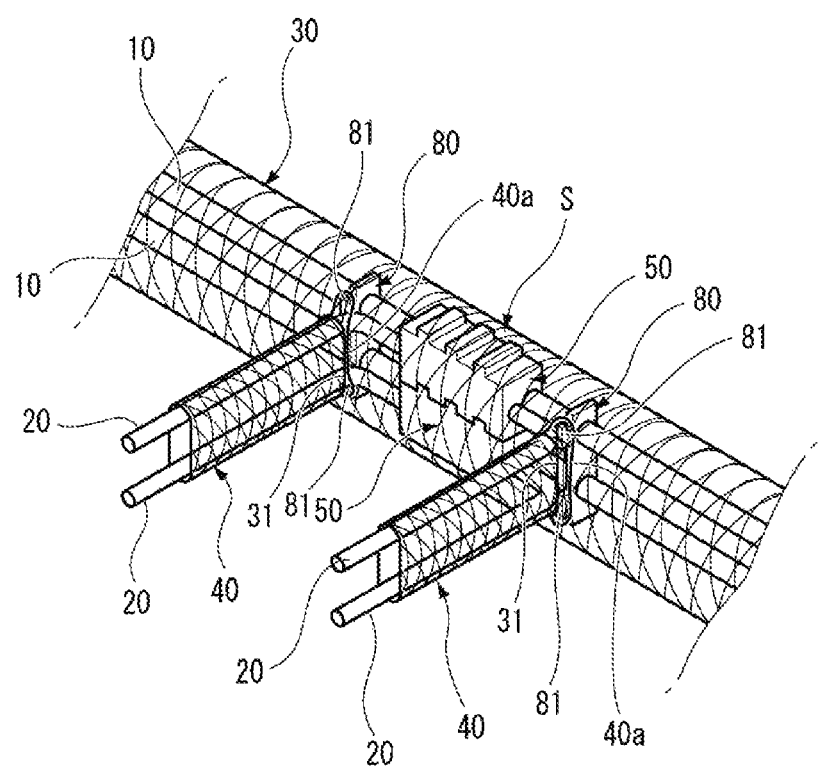
FIG. 9 is a perspective view of the branch portion of the first electric wire and the second electric wire in a state where the second shield tubes are engaged to the engaging members for describing the electric wire branching method according to an embodiment.

FIG. 6A is a plan view of the first electric wire and the second electric wire with conductors exposed, FIG. 6B is a plan view of the first electric wire and the second electric wire with the conductors being joined to each other, and FIG. 6C is a perspective view of the connecting portion of the first electric wire and the second electric wire covered with a mold portion. FIG. 7A is a perspective view of the branch portion of the first electric wire and the second electric wire with mold portions being overlapped, FIG. 7B is a perspective view of the branch portion of the first electric wire and the second electric wire covered with a first shield tube, and FIG. 7C is a perspective view of the branch portion of the first electric wire and the second electric wire in a state where openings are formed on the first shield tube. FIG. 8A is a perspective view of the branch portion of the first electric wire and the second electric wire in a state where the second electric wires are drawn out from the openings, and FIG. 8B is a perspective view of the branch portion of the first electric wire and the second electric wire in a state where second shield tubes are attached to the second electric wires. FIG. 9 is a perspective view of the branch portion of the first electric wire and the second electric wire in a state where the second shield tubes are engaged to the engaging members for describing the electric wire branching method.

(Electric Wire Connecting Step)

As shown in FIG. 6A, the outer sheaths 12, 22 are removed from the first electric wire 10 and the second electric wire 20, and the conductors 11, 21 are exposed. Next, as shown in FIG. 6B, the exposed conductors 11, 21 of the first electric wire 10 and the second electric wire 20 are joined to each other, and the first electric wire 10 and the second electric wire 20 are electrically connected.

(Molding Step)

As shown in FIG. 6C, the mold portion 50 made of insulating resin is molded to cover the connecting portion of the conductors 11, 21 of the first electric wire 10 and the second electric wire 20. Therefore, the connecting portion of the conductors 11, 21 of the first electric wire 10 and the second electric wire 20 is covered by the mold portion 50 to form a branch portion S which is protected and waterproofed. As shown in FIG. 7A, the mold portions 50 are overlapped and connected, and the first electric wire 10 and the second electric wire 20 are put together. Further, engaging members 80 are provided on the first electric wires 10 at both sides of the mold portions 50. The engaging member 80 is provided by molding in the same manner as the mold portion 50.

(First Shielding Step)

As shown in FIG. 7B, the first electric wire 10 and the second electric wire 20 pass through the first shield tube 30. Therefore, the peripheries of the first electric wire 10 and the second electric wire 20 including the branch portions S are covered by the first shield tube 30.

(Drawing Step)

As shown in FIG. 7C, the openings 31 are formed in the vicinity of the branch portion S on the first shield tube 30. Next, as shown in FIG. 8A, the second electric wires 20 passing through the first shield tube 30 are drawn out from the openings 31 of the first shield tube 30.

(Second Shielding Step)

As shown in FIG. 8B, the second electric wires 20 drawn out from the openings 31 of the first shield tube 30 pass through the second shield tubes 40. Therefore, the peripheries of the second electric wires 20 are covered by the second shield tubes 40.

(Shield Tube Joining Step)

As shown in FIG. 9, the end portions 40a of the second shield tubes s 40 through the second electric wires 20 passing are inserted into the first shield tube 30 from the openings 31. Next, the end portions 40a of the second shield tubes wires 40 inserted from the openings 31 are engaged by the engaging claws 81 of the engaging members 80. Therefore, the second shield tubes 40 are joined to the first shield tube 30 without gaps.

Reference Example

A reference example is described as follows.

Figure 10:
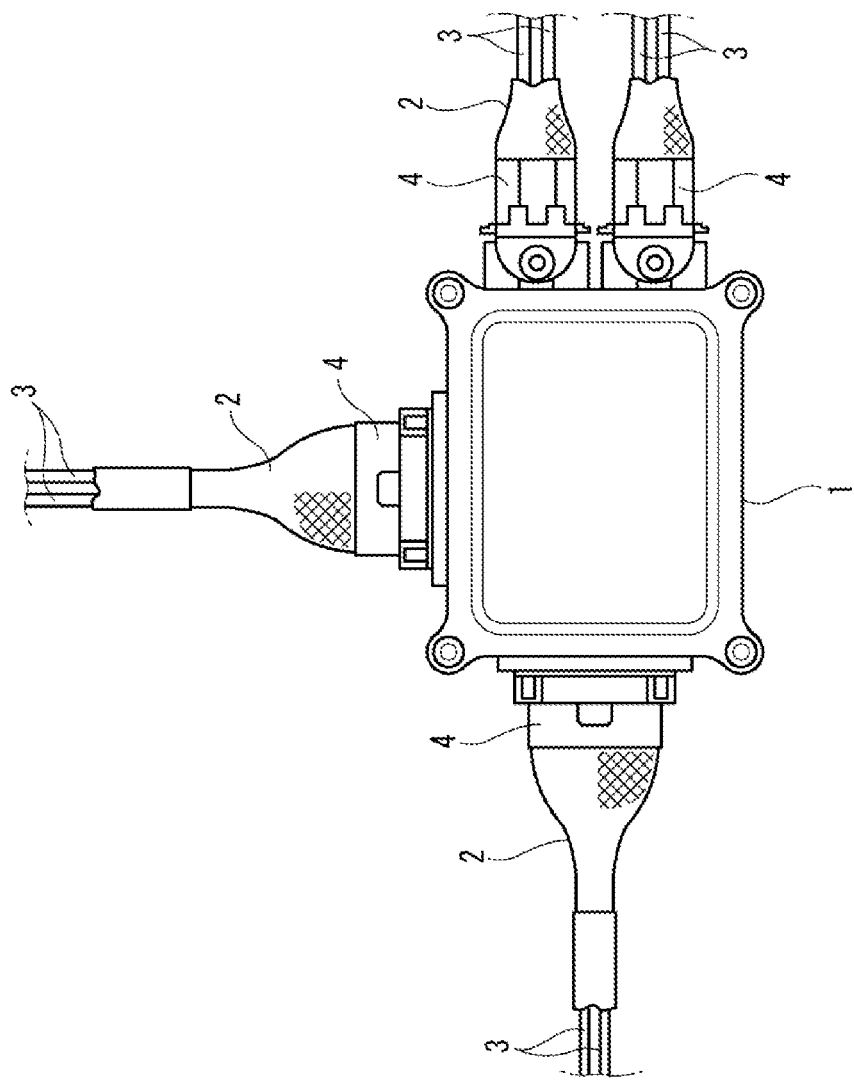
FIG. 10 is a view for describing a reference example, and is a plan view of a branch box to which electric wires are connected.

FIG. 10 is a view for describing a reference example, and is a plan view of a branch box to which electric wires are connected.

As shown in FIG. 10, electric wires 3 are branched using a branch box 1 in the reference example. The branch box 1 is formed by a conductive metal shield case, and a bus bar is housed therein. In the branch box 1, a plurality of electric wires 3 whose peripheries are covered by shield tubes 2 formed by braids are connected by connectors 4, and the shield tubes 2 are connected by the branch box 1. In the branch box 1, predetermined electric wires 3 are electrically connected with each other by the bus bar in the branch box 1.

In the structure according to the reference example, the connectors 4 and the branch box 1 housing the bus bar are used, thereby increasing the number of components and the cost. In addition, the structure is complicated and the size thereof is increased, thereby requiring complicated assembly work. Moreover, in the structure according to the reference example, the number of the branch circuits and the branch positions are restricted, and therefore it is difficult to cope with changes in the number of electric wires 3 and change in the branch positions, which causes a problem of poor versatility.

On the contrary, according to the branch circuit body and the electric wire branching method of the embodiment described above, the second electric wires 20 can easily be branched from the first electric wires 10 without using a branch device such as a branch box, a power distribution module or a connector. Therefore, it possible to reduce the cost and improve the assembling workability by simplifying the structure, and further reduce the size thereof. Further, the branch position is freely disposed, the number of electric wires can be easily increased or decreased, and high versatility can be obtained. Further, the end portions 40a of the second shield tubes 40 are engaged by the engaging claws 81 of the engaging members 80 provided on the first electric wires 10, so that the second shield tubes 40 can be joined to the first shield tube 30 without gaps. Therefore, the first electric wires 10 and the second electric wires 20 can be collectively shielded by the first shield tube 30 and the second shield tubes 40 reliably, so that a good shielding effect can be obtained.

In addition, the connecting portion between the first electric wires 10 and the second electric wires 20 is covered by the mold portion 50, so that the connecting portion can be protected and waterproofed reliably.

Further, the first electric wires 10 are integrally molded with the engaging members 80 for engaging the second shield tubes 40, so that the structure can be further simplified and the size thereof can be reduced.

The second shield tubes 40 may be joined to the first shield tube 30 by other joining mechanisms together with an engaging means by the engaging members 80.

(Modifications)

Modifications including a joining mechanism for joining the second shield tubes 40 to the first shield tube 30 together with the engaging members 80 are described.

(First Modification)

Figure 11:
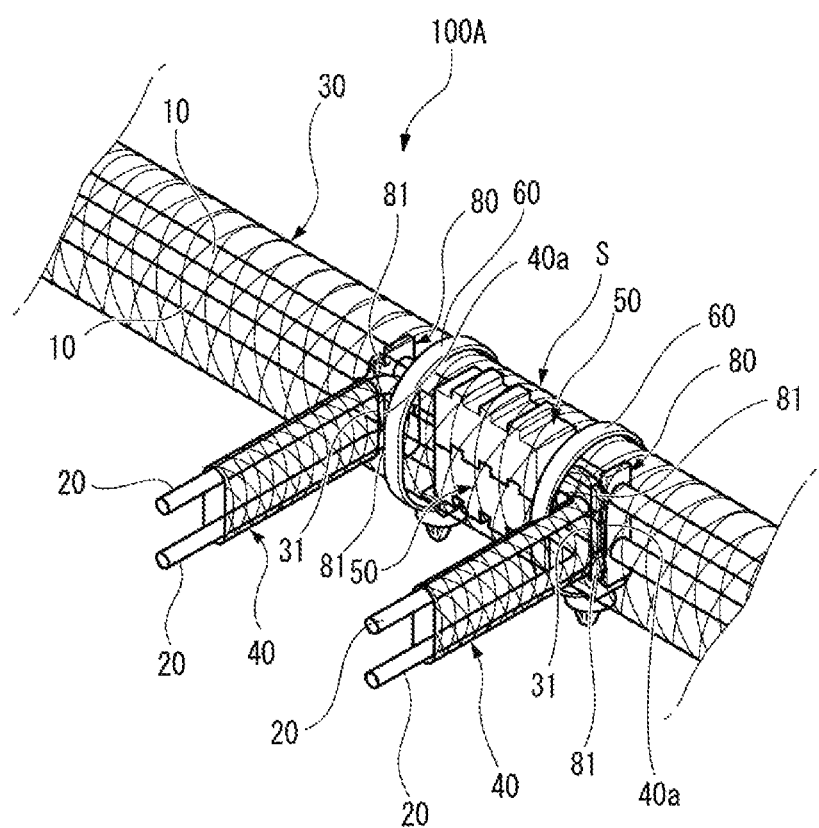
FIG. 11 is a perspective view of a branch portion of a branch circuit body according to a first modification.

FIG. 11 is a perspective view of a branch portion of a branch circuit body according to the first modification.

As shown in FIG. 11, in a branch circuit body 100A according to the first modification, the end portions 40a of the second shield tubes 40 which are inserted through the openings 31 and engaged by the engaging claws 81 of the engaging members 80 are bent toward the branch portion S along the second electric wires 20. Further, binding bands (joining mechanism) 60 are wound between the openings 31 on the first shield tube 30 and the branch portion S, the second shield tubes 40 inserted through the openings 31 and bent toward the branch portion S are bound and joined by the binding bands 60 together with the first shield tube 30, the first electric wires 10 and the second electric wires 20.

According to the first modification, the second shield tubes 40 are engaged by the engaging claws 81 of the engaging members 80 and joined to the first shield tube 30 by the binding bands 60, so that the second shield tubes 40 can be more firmly joined to the first shield tube 30, thereby obtaining a good shielding effect.

(Second Modification)

Figure 12A:
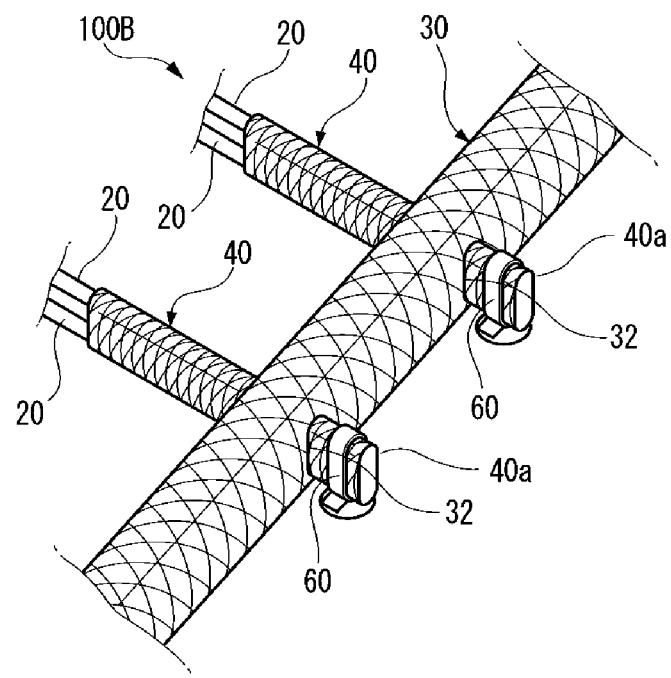
FIG. 12A and FIG. 12B are perspective views of a branch portion of a branch circuit body according to a second modification.
Figure 12B:
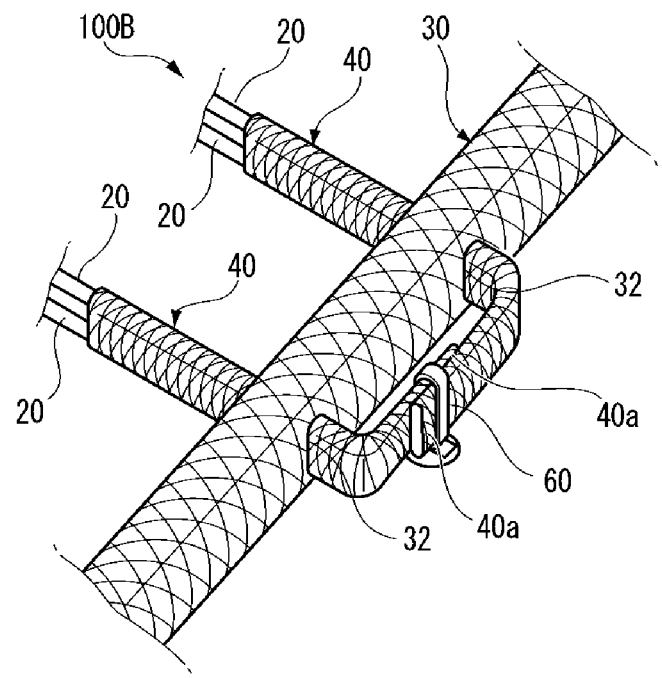

FIG. 12A and FIG. 12B are perspective views of a branch portion of a branch circuit body according to the second modification.

As shown in FIG. 12A, in a branch circuit body 100B according to the second modification, the end portions 40*a* of the second shield tubes 40 which are inserted through the openings 31 of the first shield tube 30 and engaged by the engaging claws 81 of the engaging members 80 are drawn out from openings 32 on a side opposite to the openings 31. Further, the binding bands 60 are wound around the end portions 40*a* of the second shield tubes 40 drawn out from the openings 32, so that the second shield tubes 40 are engaged and joined to the first shield tube 30. It is desirable to bind a part of the first shield tube 30 together with the end portions 40*a* of the second shield tubes 40 when binding by the binding bands 60.

According to the second modification, the second shield tubes 40 are engaged by the engaging claws 81 of the engaging members 80 and joined to the first shield tube 30 by the binding bands 60, so that the second shield tubes 40 can be more firmly joined to the first shield tube 30 without gaps, thereby obtaining a good shielding effect.

In the second modification, as shown in FIG. 12B, the end portions 40*a* of the second shield tubes 40 which are drawn out from the openings 32 of the first shield tube 30 may be stacked with each other, and the stacked portions may be bound by the binding bands 60. Accordingly, the end portions 40*a* of the second shield tubes 40 are bound with each other, so that the second shield tubes 40 can be reliably prevented from coming off from the first shield tube 30.

(Third Modification)

Figure 13A:
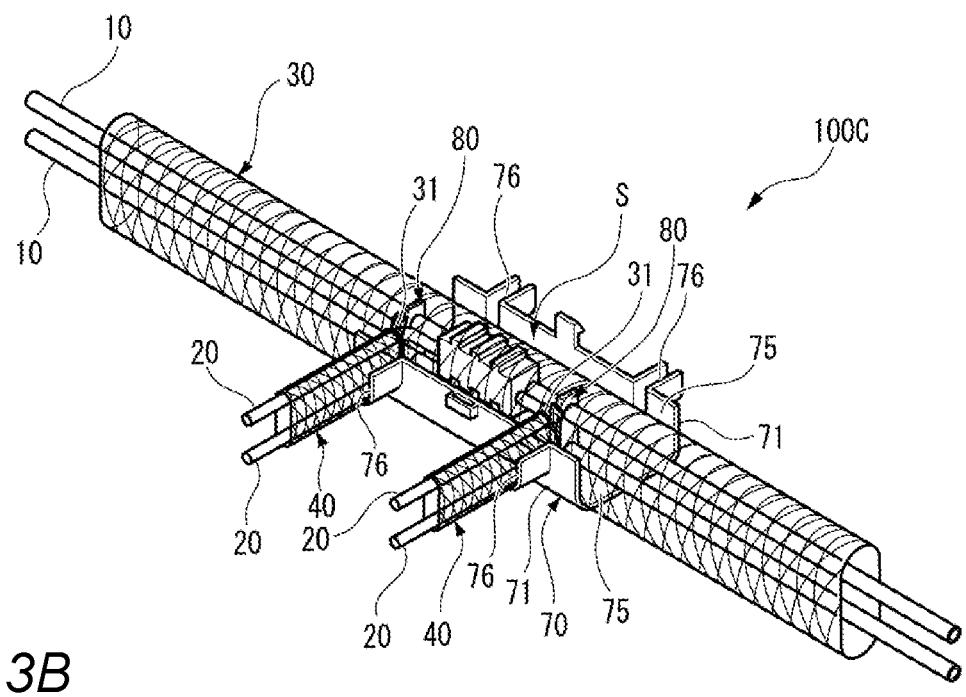
FIG. 13A and FIG. 13B are perspective views of a branch portion of a branch circuit body according to a third modification.
Figure 13B:
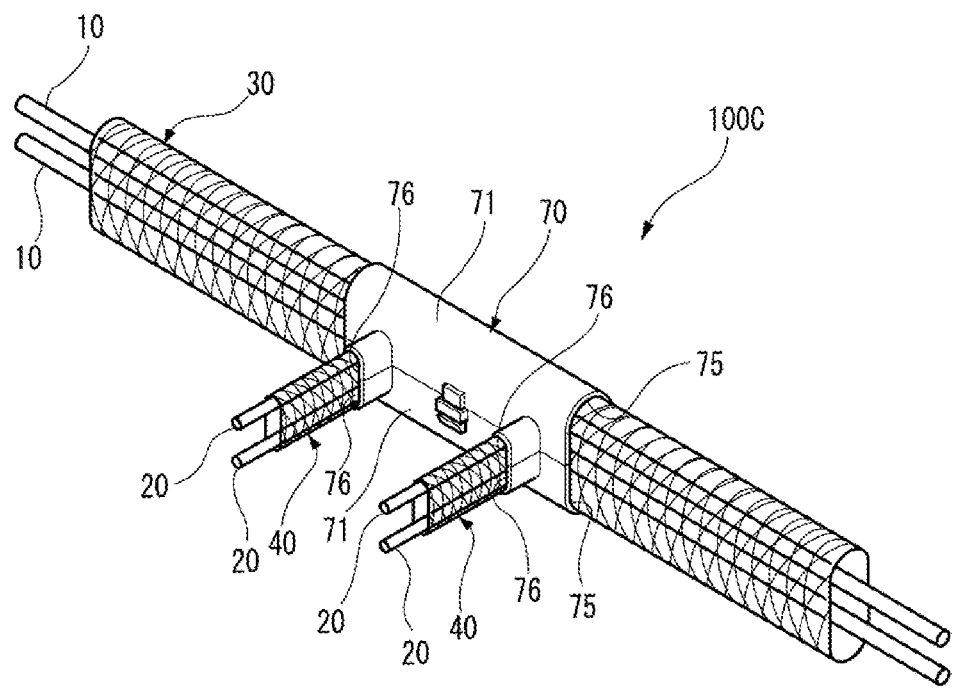

FIG. 13A and FIG. 13B are perspective views of a branch portion of a branch circuit body according to the third modification.

As shown in FIG. 13A and FIG. 13B, in a branch circuit body 100C according to the third modification, the second shield tubes 40 are joined to the first shield tube 30 by using a holder (joining mechanism) 70 which covers the periphery of the branch portion S while being engaged by the engaging claws 81 of the engaging members 80. The holder 70 is formed by electrically insulating resin and has a structure in which a pair of divided holders 71, which are halved vertically, are rotatably connected by a hinge portion (not shown). The divided holder 71 has a trunk line recessed portion 75 into which the first shield tube 30 is fitted and branch line recessed portions 76 into which the second shield tubes 40 are fitted.

In order to mount the holder 70, first, the first shield tube 30 is fitted into the trunk line recessed portion 75, and the second shield tubes 40 are fitted into the branch line recessed portions 76 of one divided holder 71 (see FIG. 13A). Then, the other divided holder 71 is rotated so as to cover the one divided holder 71. As described above, the first shield tube 30 is fitted into the trunk line recessed portion 75 of the divided holder 71, and further, the second shield tubes 40 are separately fitted into the branch line recessed portions 76 of the divided holder 71 (see FIG. 13B). Accordingly, at the branch portion S, the first shield tube 30 and the second shield tubes 40 are covered and held, and the second shield tubes 40 are maintained in a state of being joined to the first shield tube 30.

According to the third modification, the second shield tubes 40 are engaged by the engaging claws 81 of the engaging members 80 while being held by the holder 70. Accordingly, the second shield tubes 40 can be easily and more firmly joined to the first shield tube 30 without gaps, and a good shielding effect can be obtained.

(Fourth Modification)

Figure 14:
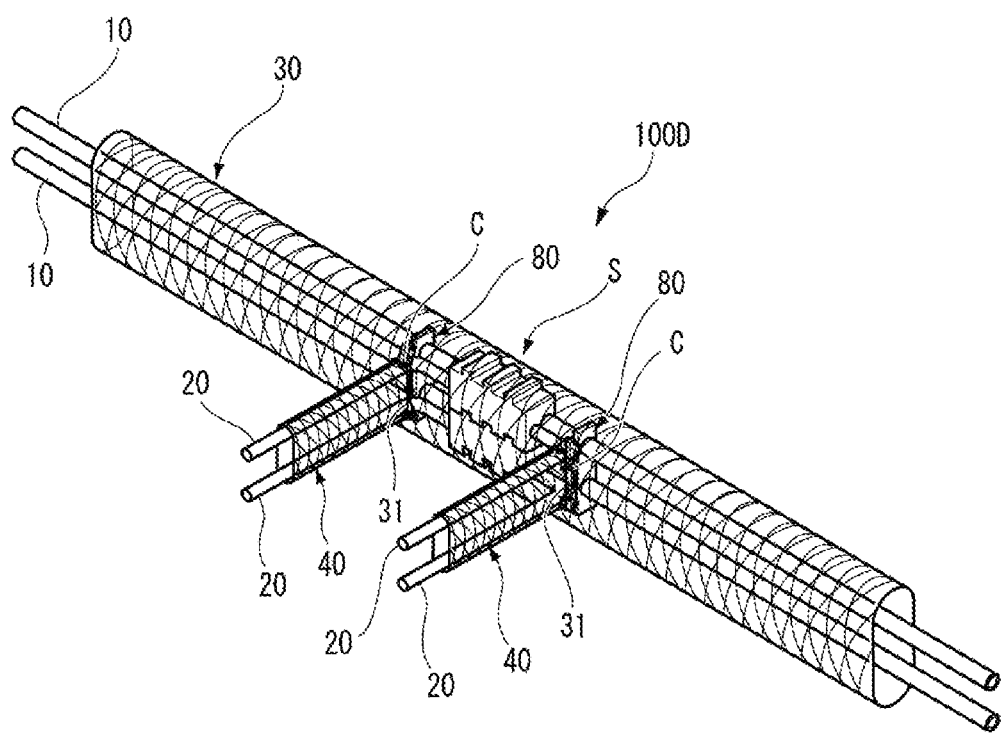
FIG. 14 is a perspective view of a branch portion of a branch circuit body according to a fourth modification.

FIG. 14 is a perspective view of a branch portion of a branch circuit body according to the fourth modification.

As shown in FIG. 14, in the branch circuit body 100D according to the fourth modification, the second shield tubes 40 are engaged by the engaging claws 81 of the engaging members 80, and edge portions of the openings 31 of the first shield tube 30 are joined to the peripheries of the second shield tubes 40 inserted into the openings 31. Examples of the joining method include joining by welding, ultrasonic welding, joining by a stapler, or the like.

According to the fourth modification, the second shield tubes 40 are engaged by the engaging claws 81 of the engaging members 80, and the second shield tubes 40 can be easily and more firmly joined to the first shield tube 30 without gaps by the joining in a joining mechanism C, thereby obtaining a good shielding effect.

In the first and second modifications, the second shield tubes 40 are bound and joined to the first shield tube 30 by the binding bands 60, and instead of the binding bands 60, an insulating tape may be wound to bind and join the second shield tubes 40 to the first shield tube 30.

Incidentally, the present invention is not limited to the above-described exemplary embodiments and modifications, but may be appropriately modified, improved or the like. In addition, materials, shapes, dimensions, numerals, disposition locations or the like of each constituent element in the above-described exemplary embodiments and modifications are optional and not limited.

For example, in the above embodiment, connecting portion between the conductors 11, 21 of the first electric wire 10 and the second electric wire 20 are protected and waterproofed by being covered by the mold portion 50, and the connecting portion between the conductors 11, 21 may also be protected and waterproofed by being wrapped with an insulating tape or the like.

Further, the first shield tube 30 and the second shield tubes 40 are not limited to a braid formed by knitting element wires into a tubular shape, and may be formed by forming a conductive metal foil such as aluminum or copper in a tubular shape. Further, the numbers of the first electric wire 10 and the second electric wire 20 are not limited to the above-described embodiment, but may be increased or decreased according to the circuit.

In accordance with embodiments and modifications, a branch circuit body includes: a first electric wire; a first shield tube that covers the first electric wire and has an opening; a second electric wire that is electrically connected to the first electric wire and is drawn out from the opening; a second shield tube that covers the second electric wire and has an end portion inserted into the opening; and an engaging member that is provided on the first electric wire and configured to engage with the end portion of the second shield tube inserted from the opening.

According to this structure, the second electric wires can easily be branched from the first electric wires without using a branch device such as a branch box, a power distribution module or a connector. Further, the end portions of the second shield tubes are engaged by the engaging claws of the engaging members provided on the first electric wires, so that the second shield tubes can be joined to the first shield tube without gaps, and the first electric wires and the second electric wires can be collectively shielded by the first shield tube and the second shield tubes reliably. Therefore, it possible to reduce the cost and improve the assembling workability by simplifying the structure, and further reduce the size thereof. Further, the branch position is freely disposed, the number of electric wires can be easily increased or decreased, and high versatility can be obtained.

In accordance with embodiments and modifications, the branch circuit body may include a mold portion that covers a connecting portion of the first electric wire and the second electric wire. According to this structure, the connecting portion would be protected and waterproofed reliably.

In accordance with embodiments, the engaging member may be integrally formed with the first electric wire. According to this structure, the structure would be further simplified and the size thereof can be reduced.

In accordance with embodiments and modifications, a joining mechanism may join the second shield tube engaged by the engaging member to the first shield tube. Accordingly, the second shield tubes would be more reliably joined to the first shield tube, thereby obtaining a good shielding effect.

In accordance with embodiments and modification, in a manufacturing method of branch circuit body, a first electric wire and a second electric wire are electrically connected to each other, the first electric wire and the second electric wire are inserted through a first shield tube, the second electric wire is drawn from an opening of the first shield tube in a vicinity of a connecting portion of the first electric wire and the second electric wire, the second electric wire is inserted through a second shield tube, an end portion of the second shield tube is inserted into the opening, and the end portion of the second shield tube is engaged to an engaging member provided on the first electric wire. Accordingly, the second electric wires would easily be branched from the first electric wires without using a branch device such as a branch box, a power distribution module or a connector. Further, the end portions of the second shield tubes are engaged by the engaging claws of the engaging members provided on the first electric wires, so that the second shield tubes can be joined to the first shield tube without gaps, and the first electric wires and the second electric wires can be collectively shielded by the first shield tube and the second shield tubes reliably. Therefore, it possible to reduce the cost and improve the assembling workability by simplifying the structure, and further reduce the size thereof. Further, the branch position is freely disposed, the number of electric wires can be easily increased or decreased, and high versatility can be obtained.

In accordance with embodiments and modifications, the connecting portion between the first electric wires and the second electric wires would be covered by the mold portion. Accordingly, the connecting portion can be protected and waterproofed reliably.

According to embodiments and modifications, a branch circuit body and an electric wire branching method that can easily branch the electric wire at low cost while ensuring a good shield function, and further can simplify the structure, reduce the size and improve versatility would be provided.

The invention claimed is:

1. A branch circuit body comprising:
 a first electric wire;
 a first shield tube that covers the first electric wire and has an opening;
 a second electric wire that is electrically connected to the first electric wire and is drawn out from the opening;
 a second shield tube that covers the second electric wire and has an end portion inserted into the opening; and
 an engaging member that is provided on the first electric wire and configured to engage with the end portion of the second shield tube inserted from the opening.

2. The branch circuit body according to claim 1, wherein the engaging member includes an engaging claw which engages the end portion of the second shield tube.

3. The branch circuit body according to claim 1, further comprising:
 a mold portion that covers a connecting portion of the first electric wire and the second electric wire.

4. The branch circuit body according to claim 1, wherein the engaging member is integrally formed with the first electric wire.

5. The branch circuit body according to claim 1, further comprising:
 a joining mechanism that joins the second shield tube engaged by the engaging member to the first shield tube.

6. An electric wire branching method for branching a second electric wire from a first electric wire, the first electric wire and the second electric wire being shielded together, the electric wire branching method comprising:
 electrically connecting the first electric wire and the second electric wire to each other;
 passing the first electric wire and the second electric wire through a first shield tube;
 drawing the second electric wire from an opening on the first shield tube in a vicinity of a connecting portion of the first electric wire and the second electric wire;
 passing the second electric wire through a second shield tube; and
 inserting an end portion of the second shield tube into the opening and engaging the end portion of the second shield tube to an engaging member provided on the first electric wire.

7. The electric wire branching method according to claim 6, wherein the engaging member has a pre-provided engaging claw provided on the first electric wire.

8. The electric wire branching method according to claim 6, further comprising:
 forming a mold portion that covers the connecting portion between the first electric wire and the second electric wire.

9. A manufacturing method of a branch circuit body, the manufacturing method comprising:
 electrically connecting a first electric wire and a second electric wire to each other;
 passing the first electric wire and the second electric wire through a first shield tube;
 drawing the second electric wire from an opening on the first shield tube in a vicinity of a connecting portion of the first electric wire and the second electric wire;
 passing the second electric wire through a second shield tube; and
 inserting an end portion of the second shield tube into the opening and engaging the end portion of the second shield tube to an engaging member provided on the first electric wire.

10. The manufacturing method according to claim 9, wherein the engaging member has a pre-provided engaging claw provided on the first electric wire.

11. The manufacturing method according to claim 9, further comprising:
 forming a mold portion that covers the connecting portion between the first electric wire and the second electric wire.

* * * * *